(12) United States Patent
Hue

(10) Patent No.: US 6,993,746 B2
(45) Date of Patent: Jan. 31, 2006

(54) CONFIGURATION TOOL FOR BUILDING A USER APPLICATION FOR MULTIPLE OPERATING SYSTEMS

(75) Inventor: Vincent Hue, Vannes (FR)

(73) Assignee: Wind River Systems, Inc., Alameda, CA (US)

(*) Notice: Subject to any disclaimer, the term of this patent is extended or adjusted under 35 U.S.C. 154(b) by 568 days.

(21) Appl. No.: 10/126,601

(22) Filed: Apr. 19, 2002

(65) Prior Publication Data

US 2003/0200356 A1    Oct. 23, 2003

(51) Int. Cl.
*G06F 9/45* (2006.01)

(52) U.S. Cl. .................................................... 717/121

(58) Field of Classification Search ................. 717/121
See application file for complete search history.

(56) References Cited

U.S. PATENT DOCUMENTS 5,504,904 A * 4/1996 Dayan et al. .................. 713/1
2002/0138720 A1 * 9/2002 Yu et al. ..................... 713/100

OTHER PUBLICATIONS

Microsoft Press Computer Dictionary, 3rd. Ed., p. 49-50.*

* cited by examiner

*Primary Examiner*—John Chavis
(74) *Attorney, Agent, or Firm*—Davidson, Davidson & Kappel, LLC

(57) ABSTRACT

A method for configuring a plurality of operating systems is provided. A set of dependencies is found based on an application and an operating system configuration for a first operating system of a plurality of operating systems. Based on the set of dependencies as well as user-selected options and parameters, a set of components is located. The first operating system is created by adding the set of components to a kernel of the first operating system. The above steps are repeated for each of the operating systems.

67 Claims, 6 Drawing Sheets

CONFIGURATION TOOL FOR BUILDING A USER APPLICATION FOR MULTIPLE OPERATING SYSTEMS

BACKGROUND INFORMATION

A computer program can be viewed as a detailed plan or procedure for solving a problem with a computer: an ordered sequence of computational instructions necessary to achieve such a solution. The distinction between computer programs and equipment is often made by referring to the former as software and the latter as hardware. An operating system (OS) is a set of programs that controls the interaction between applications and hardware. The OS also controls the interaction between different applications.

In conventional computer systems, the OS provides generalized system services to application programs, such as utility and daemon programs. These system services conventionally include access to hardware peripheral devices attached directly or indirectly to the computer system. A variety of different schemes exist for implementing OSes, but most include a kernel and module architecture. The kernel contains the most heavily used portions of the operations system, such as process management and handling of device interupts. Modules, however, contain portions of the operating system that are not used as frequently, for example, device drivers specific to hardware and libraries specific to certain applications. However, the definitions of the kernel and modules are open to interpretation, and different types of OSes include different elements in the kernels and modules. For example, in an OS based on a monolithic kernel, the kernel contains virtually the complete operating system, including scheduling, file systems, device drivers, and memory management. However, in an OS based on a microkernel, only a few essential functions are assigned to the kernel, while other OS processes are provided by modules that execute on the kernel.

To form a functioning OS, the modules are integrated into the kernel. This is sometimes known as a build. The OS is then stored in binary format, known as an image, on a memory device, such as a hard drive. For example, in Linux, a Unix based OS, the OS is generated by forming a configuration file, setting all the source dependencies, compiling source code files into object files, and then linking the object files to form an image.

Applications that execute on the OS may require device drivers, which are used to provide an interface to the hardware on the system. APIs (application program interfaces) are used for compatibility between a particular application and the OS. Both device drivers and APIs can be implemented as modules. Applications may also require specific modules in order to function, for example, a math application could require a module that contains trigonometric functions.

Since different applications may require different modules, configuration tools are used to configure an OS for a particular application. The configuration tools verify that the operating system is coherent and fits the application needs. For example, the configuration tools may verify that all the modules that the application needs are present and properly initialized.

One way that configuration tools verify the operating system is by a dependency analysis. A dependency analysis finds all the dependancies between modules of an OS and a particular application. Dependency analysis works by symbol analysis and explicit dependence. Symbol analysis finds undefined symbols in application object files. Explicit dependence analyzes a file that states which second components should be included if a first component is included. For example, a component descriptor file may state that if component Y is included, then component X is also included.

An example of a configuration tool that uses a dependency analysis is the project tool in Tornado™ 2.0. The project tool works by verifying that a set of files (e.g., application files and BSP files), an OS configuration (e.g., a list of components and their parameters), and a set of build specification (e.g., parameters used during the build phase) are correct for a particular application. The verification procedure uses a dependency analysis where the dependencies are expressed in terms of components. A component is a logical set of modules. For example, if a symbol is used by an application and is defined in a module, then the corresponding component is included in the OS.

However, the project tool works for one OS. Thus, to develop a project on more than one OS requires a separate project for each OS. For example, if a user wants develop an application on VxWorks® 5.4 for later use on VxWorks®/Cert, the user configures VxWorks® 5.4 and then VxWorks®/Cert for the application. The user can then develop the application on the VxWorks® 5.4 and then switch to the VxWorks®/Cert to test it. If the user then wants to debug the application or develop it further, the user switches back to VxWorks® 5.4. This results in substantial expenditures of money, time, and computing resources.

SUMMARY

In accordance with a first embodiment of the present invention, a software tool for configuring a plurality of operating systems is provided which is operable to perform the steps described below. A set of dependencies is found based on an application and an operating system configuration for a first operating system of a plurality of operating systems. Based on the set of dependencies, a set of components is identified. The first operating system is created by adding the set of components to a kernel of the first operating system. The above steps are repeated for each other operating system of the plurality of operating systems.

In accordance with a second embodiment of the present invention, a software tool for configuring a plurality of operating systems is provided which is operable to perform the steps described below. A set of dependencies is found based on an application and an operating system configuration for a first operating system of a plurality of operating systems. Based on the set of dependencies, a set of components is identified. The first operating system is created by adding the set of components to a kernel of the first operating system. The above steps are repeated for a second operating system of the plurality of operating systems.

In accordance with a third embodiment of the present invention, a software tool configuring a plurality of operating systems is provided. The software tool is operable to perform the following steps. A first set of dependencies is found based on an application and an operating system configuration for a first operating system of a plurality of operating systems. Based on the first set of dependencies, a first set of components is identified. The first operating system is created by adding the first set of components to a kernel of the first operating system. A second set of dependencies is found based on the application and the operating system configuration for a second operating system. Based on the second set of dependencies, a second set of components is identified. The second operating system is created by adding the second set of components to the kernel of the second operating system.

In accordance with a fourth embodiment of the present invention, a method for configuring a plurality of operating systems is provided. A set of dependencies based on an application and an operating system configuration is received for a first operating system of a plurality of operating systems on a computer system. Based on the set of dependencies, a set of components is identified. An image of the first operating system is created by adding the set of components to a kernel of the first operating system. The now created image of the first operating system is sent to the computer system. The steps of receiving, identifying, creating and sending are repeated for a second operating system of the plurality of operating systems.

In accordance with a fifth embodiment of the present invention, a method for configuring a plurality of operating systems is provided. A set of dependencies based on an application and an operating system configuration for a first operating system of a plurality of operating systems is sent to a remote system. The first operating system of a plurality of operating systems is received. The first operating system is based on the set of dependencies and comprises a set of components and a kernel. The steps of sending and receiving are repeated for a second operating system.

In accordance with a sixth embodiment of the present invention, a method for configuring a plurality of operating systems in parallel is provided. A thread is created for each operating system of a plurality of operating systems. Each thread finds a set of dependencies based on an application and an operating system configuration for one or more of the operating systems. The threads locate a set of components based on the set of dependencies. The threads also create one or more operating systems by adding the set of components to a kernel of the operating system.

DETAILED DESCRIPTION OF THE PREFERRED EMBODIMENTS

A configuration tool according to an embodiment of the present invention finds a set of dependencies based on an application and an operating system configuration for a first operating system of a plurality of operating systems. The configuration tool locates a set of components based on the set of dependencies. A first operating system is then created by adding the set of components to a kernel. The configuration tool then repeats the above process for each remaining operating system.

Preferably, the configuration tool deals with 3 types of components: components needed by the application (which would be included after dependency analysis); user specified components (which the dependency analysis would not identify); and user specified configuration parameters. The user will configure and build a first OS for his/her application by creating a first configuration based on (1) a dependency analysis, (2) the user specified components, and (3) the user specified configuration parameters. The user will then be able to switch to a different OS, keeping the same configuration file. The configuration tool will perform a dependency analysis, and will also use information provided by the user (explicitly added components and configuration parameters) for configuring the new OS. With information provided by the dependency analysis and the information provided by the user, the configuration tool can detect potential configuration errors, such as the dependency analysis not finding a required component on the new OS, a user specified component is missing on the new OS, or two or more components are conflicting. The errors can then be reported on a user interface such as a graphical user interface.

In the above manner, the user specified components and configuration is maintained across different OSes, making it easy and fast to switch OSes. Moreover, the user gets immediate feedback about the application needs and the capability offered by the OSes. Also, the user can decide to modify his/her application so that the application uses a common set of functionality available across all the OSes. The user can within a single tool select and build a plurality of OSes.

Figure 1:
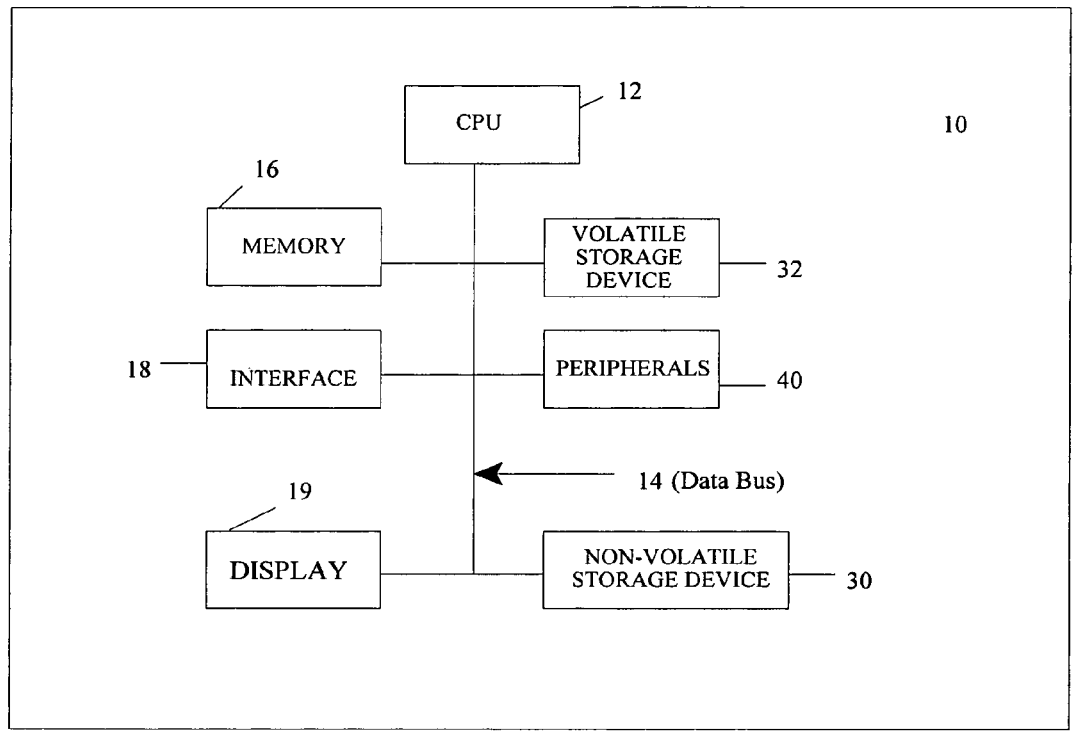
FIG. 1 shows a computer system.

FIG. 1 shows a computer system 10. The computer system 10 includes a central processing unit (CPU) 12 coupled through a system data bus 14 to a main memory (e.g., RAM) 16 and a network interface 18. Also included is a non-volatile storage device (e.g., a hard drive) 30 and a volatile storage device (e.g., RAM) 32. The operation of the network interface 18 is sufficient to support the reading of data (e.g., executable, data and configuration files) from a non-volatile resource (e.g., a network drive). A video display device 19 is also provided as a peripheral device coupled to the system bus 14. Other peripherals 40 may also function as part of the computer system 10. These other peripherals 40 may include, for example, controllers supporting audio and real-time video, or SCSI device controllers. An OS (shown in FIG. 3), which can be located on the non-volatile storage device 30 or in volatile storage device 32, is configured to function with the system data bus 14, network interface 18, video display device 19, non-volatile storage device 30, volatile storage device 32, and other peripherals 40. The OS is configured to function with the devices by a set of components (shown in FIG. 3) that are integrated into the OS. Thus, if the OS is changed, a new set of components is integrated into the new OS in order to restore the functionality with the hardware.

An application (also shown in FIG. 3) executing on the OS may need to make use of the system data bus 14, network interface 18, video display device 19, non-volatile storage device 30, volatile storage device 32, and/or other peripherals 40. To do so, the application requests the OS to perform a function on one of the devices 14,18,19,30,32, and/or 40. The OS then performs the function on the device 14,18,19, 30,32, and/or 40. However, in order to do so, the OS uses the components required for that device 14,18,19,30,32, and/or 40. Thus, for the application to operate effectively, the components required for any devices 14,18,19,30,32, and/or 40 that it uses are integrated into the OS. For example, if an application uses the network interface 18 and video display device 19, then the components for the network interface 18 and the video display 19 are included in the OS.

Figure 2:
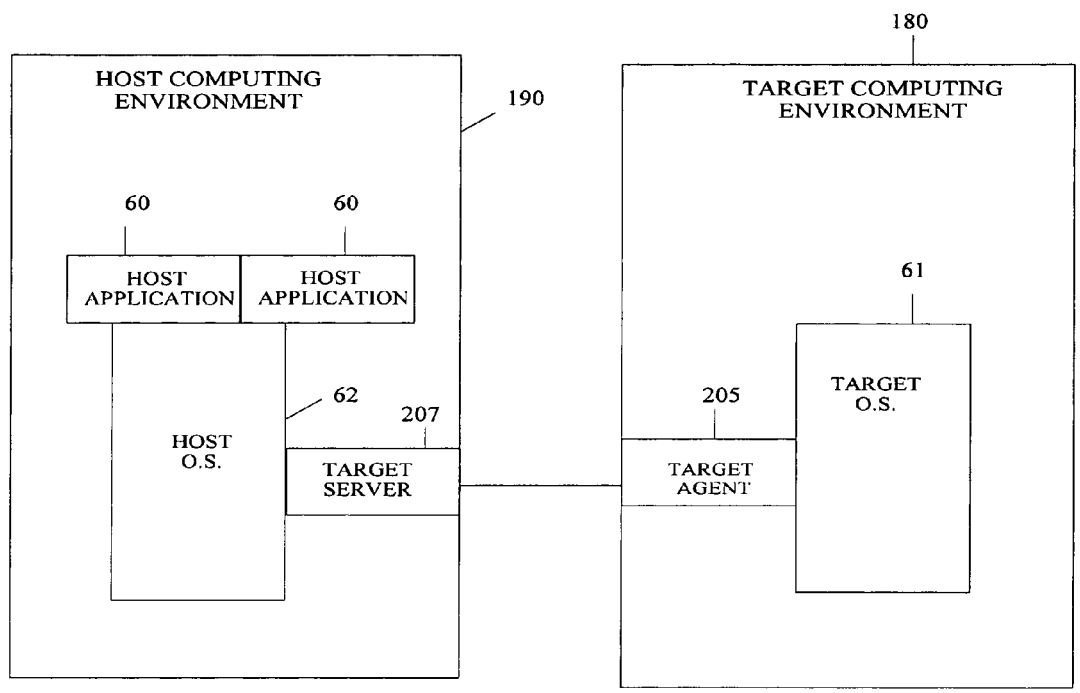
FIG. 2 shows a target system and a host system.

FIG. 2 shows a target computing environment 180 (hereinafter "target system") and a host computing environment 190 (hereinafter "host system"). The target system 180 and the host system 190 may have the same architecture as the system 10 shown in FIG. 1. However, it should be apparent to one skilled in the art that the target system 180 and the host system 190 can have other architectures and that this is offered merely as an example. The target system 180 comprises a target agent 205 and a target OS 61. The target OS 61 is configured specific to the target system 180. The target OS 61 is also configured to communicate with the target agent 205. The target agent 205 executes on the target OS 61 and communicates with the host system 190 via a target server 207. However, in order to communicate effectively with the host system 190, the target server 207 is specific to the target agent 205. In certain embodiments, the target system 180 can be a development board.

The host system 190 comprises a host OS 62 and a plurality of host applications 60. One of the host applications 60 can be the target server 207. In order to operate effectively, the host OS 62 is configured to work with the target server 207. The host OS 62 can be configured to work with the target server 207 through a "back-end." In an embodiment where the target server 207 uses serial link communication, the host OS 62 can be configured to support a serial port. The host OS 62 is so configured by integrating a set of components (See FIG. 3) into it. The host system 190 can be, for example, a Tornado™ development platform.

If the target system 180 is changed (e.g., from a PC development board to an ARC development board) the target OS 61 is also changed. The change of the target OS 61 requires a change of the target agent 205. This causes, in turn, a change of the target server 207, since the target server 207 is specific to the target agent 205. The host OS 62 may then require a new configuration to communicate effectively with the target server 207. This can be done by integrating a new set of components into the host OS 62.

Similarly, if the target OS 61 on a given target 180 system is changed (e.g., from VxWorks® 5.4 to VxWorks®/Cert), a change of the target agent 205 is required. This causes a change of the target server 207, since the target server 207 is specific to the target agent 205. The host OS 62 then requires a new configuration to communicate effectively with the target server 207. Again, this can also be done by integrating a new set of components into the host OS 62.

In certain embodiments, if the target agent 205 or the target system 180 is changed, the prior target OS 61 can send a request to the host system 190 for the new target OS 61. Then, based on parameters in the request, the host system 190 can form the new target OS 61. The new target OS 61 can then be sent to and then loaded on the target system 180. In certain embodiments, the target system 180 can specify a new target OS 61 in the target system 180 boot parameters. Thus, the new target OS 61 will be selected when the target system 180 boots up.

Figure 3:
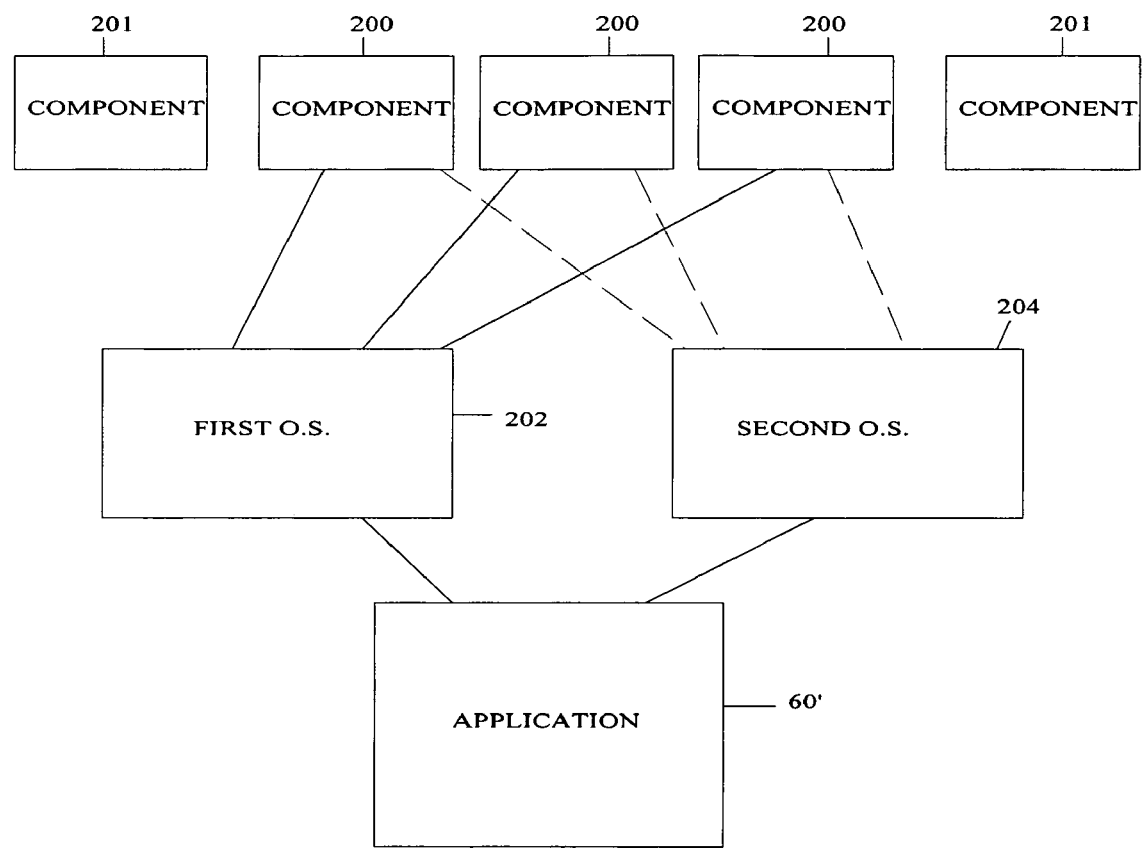
FIG. 3 shows a first and second set of components as they relate to a first and second OS.

FIG. 3 shows a first and second set of components 200,201 as they relate to a first and second OS 202,204, with similar items bearing similar reference numerals to the preceding Figures. The components 200,201 allow the OSes 202,204 to interface with devices that an application 60' uses. For example, the components 200,201 can be drivers for the system data bus 14, network interface 18, video display device 19, non-volatile storage device 30, and/or other peripherals 40. The components 200,201 may also impart functionality to the application 60'. For example, the components 200,201 might be a data base tool or a set of mathematical functions that are necessary for the application 60'. The components 200,201 may also provide an interface with a back-end of the application 60', for example, if the application 60' is the target agent. Moreover, the components 200,201 may configure the OSes 202,204 to work with a particular target system. In certain embodiments, some of the components 200,201 can be user specified (e.g., input to the system by the user via a graphical user interface, command line interface, input file, etc.) User specified components 200,201 are not called by the application 60', and thus are not recognized during a dependency analysis. The components 200,201 that are user specified could include functionality for a real-time clock, debug support, or cache management. Moreover, the user specified components 200,201 can include functionality for configuration parameters, such as cache management support, serial port speed, and clock frequency. In certain embodiments, the components 200,201 can be listed in a BSP file, for example, for a particular board architecture (e.g., an ARM processor).

Figure 6:
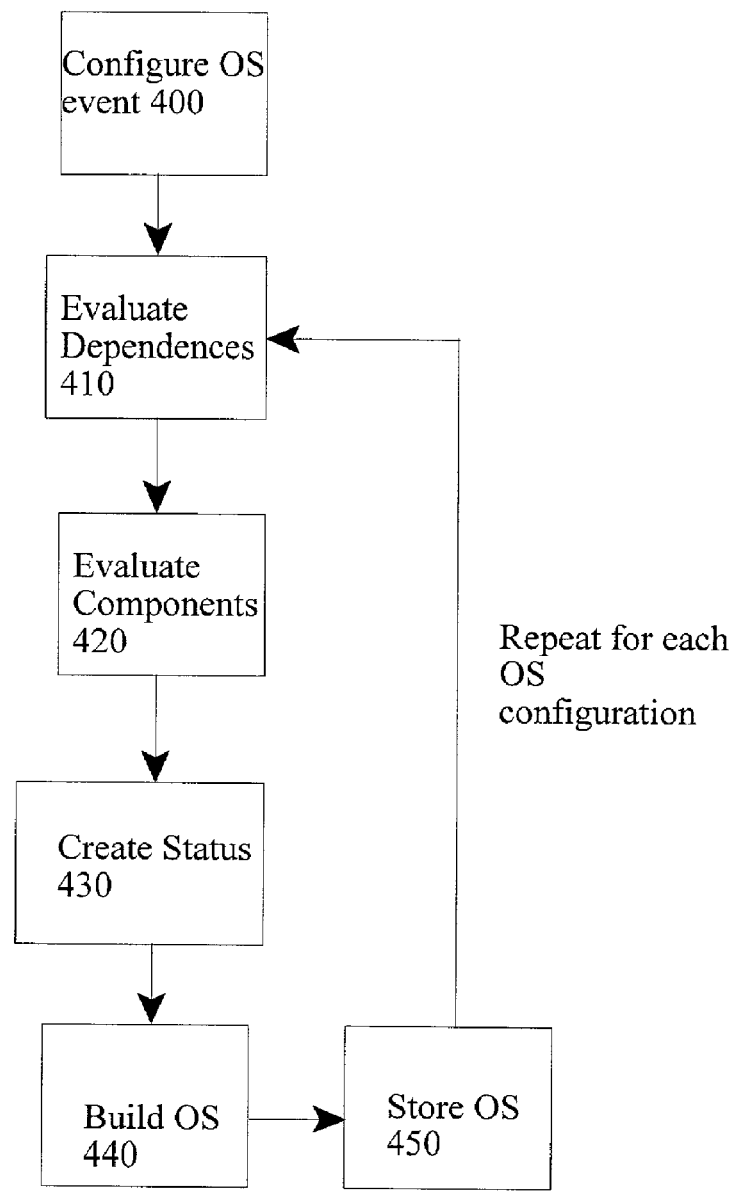
FIG. 6 shows a method for generating OSes particular to an application.

In FIG. 3, the application 60' requires the first set of components 200 in order to function correctly, but does not require the second set of components 201. Thus, if the application 60' is running on the system, the first set of components 200 form a portion of the OS 202,204 that is executing on the system. For example, if the first OS 202 is executing on the system, the first set of components 200 are loaded and integrated into the first OS 202 (as shown in FIG. 6). Likewise, if the second OS 204 is executing on the system, the first set of components 200 are loaded and integrated into the second OS 204. Preferably, the OSes 202,204 or portions thereof reside on the non-volatile storage device 30 (e.g., as an image) and/or volatile storage device 32.

Figure 4:
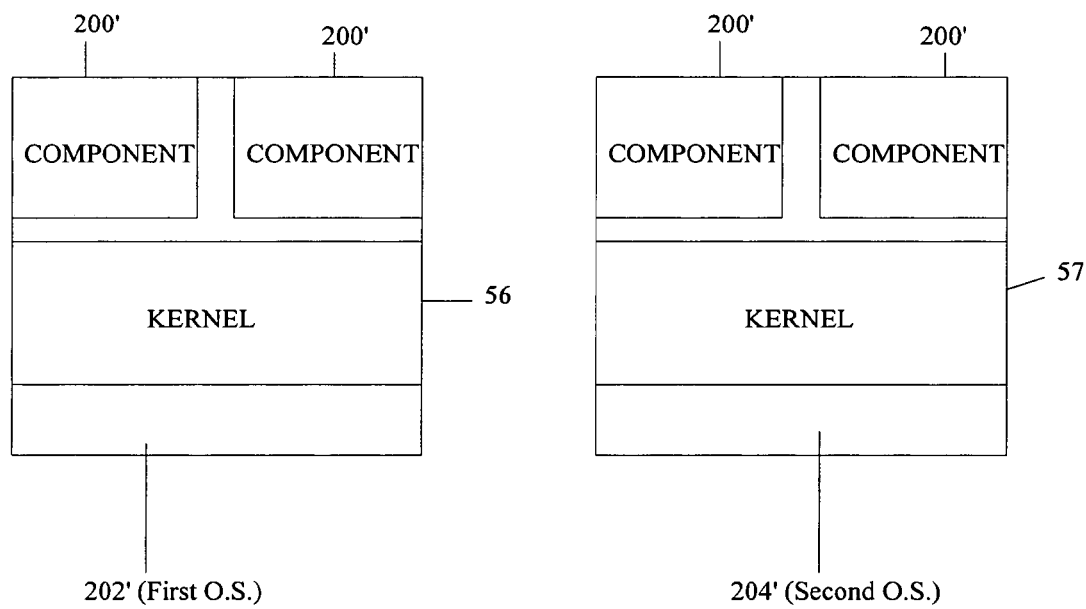
FIG. 4 shows a schematic view of the first and second OSes after the components have been integrated.

FIG. 4 shows a schematic view of a first and second OS 202',204' after the components 200' have been integrated, with similar items bearing similar reference numerals to the preceding Figures. The OSes 202',204' can function as the OS of the computer system 10, such as the target system 180. Preferably each of the OSes 202',204' comprises a kernel 56,57 along with the components 200'. The components 200' may impart functionality to the kernel 56,57 for interfacing with hardware devices, impart functionality to the application 60, communicate with the back-end of the application 60, function as APIs for the application 60, or configure the OSes 202',204' to work with the particular host system 190. In certain embodiments, the components 200' can include user specified components 200' that include functionality for a real-time clock, debug support, or cache management. Moreover, the components 200' can also include user specified components 200' that include functionality for configuration parameters, such as cache management support, serial port speed, and clock frequency. Since the OSes 202',204' are different, the components 200' that perform the same functions vary between them. For example, the component 200' used to drive the network interface 18 for the first OS 202' is different then the component 200' used to drive the network interface 18 for the second OS 204'. However, in certain embodiments, the OSes 202',204' may use the same component 200' to perform the same function. In such an embodiment, one instance of the component 200' can be loaded. The Oses 202',204' may then share the same component 200'.

Figure 5:
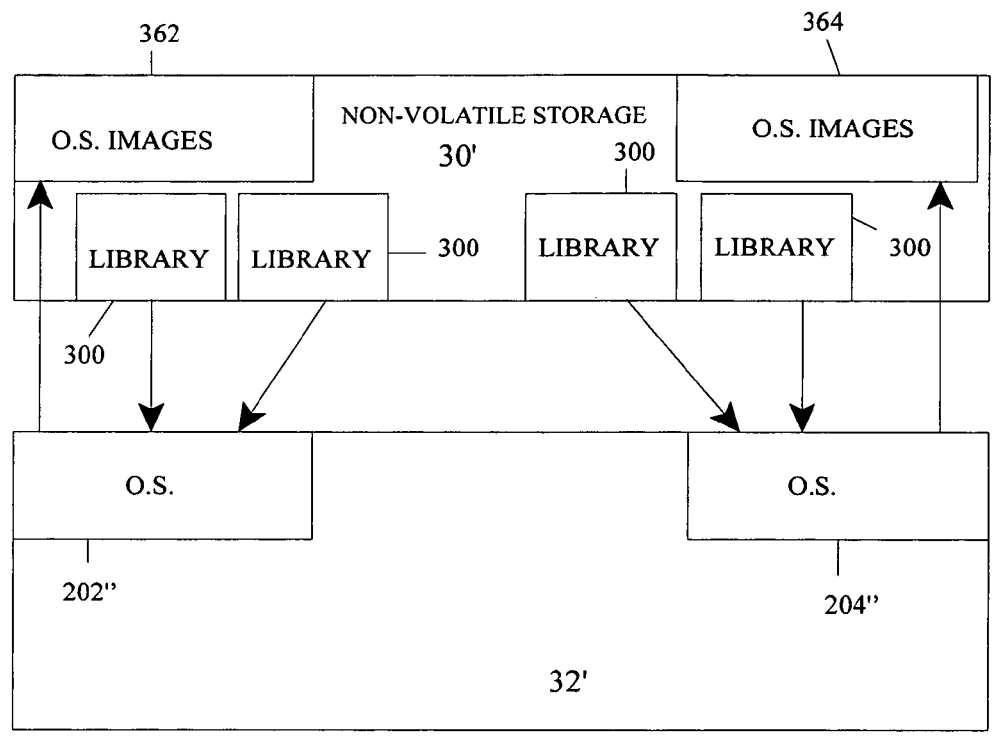
FIG. 5 shows a plurality of libraries in relation to a non-volatile storage device and the volatile storage device.

FIG. 5 shows a plurality of libraries 300 in relation to the non-volatile storage device 30' and the volatile storage device 32', with similar items bearing similar reference numerals to the preceding Figures. The plurality of libraries 300 is located on the non-volatile storage device 30'. Each of the libraries 300 comprises one or more object files (e.g., binary files) constituent of a module. The components 200 are composed of one or more modules. Preferably, each of the libraries is specific to one of the OSes 202",204". The binary images of components 200 can be loaded from the libraries 300 to form the components 200 necessary for the OSes 202",204". The components 200 are then integrated with the kernels 56,57 to form the OSes 202",204" that work with the application. Once formed, the OSes 202",204" can be stored in binary format on the non-volatile storage device 30' as a first and second OS image 362,364. The OS images 362,364 can then be loaded at a later time, without having to re-load the particular components 200 or kernels 56,57. Also, by storing the OSes 202",204" as OS images 362,364, the user may efficiently switch between them.

FIG. 6 shows an exemplary method which may be performed by a software tool for generating the OSes 202,204 required for the application 60.

A user enters a set of parameters into a software tool (Step 400). The parameters contain one or more OSes that are to be configured and one or more applications which are to execute on the OSes. The parameters may also contain components 200 that the user wants to explicitly include in the OSses. For example, the user may explicitly want to include components 200 for a real time clock, debugging support, and/or cache management. Moreover, the user may explicitly include components 200 that relate to configuration parameters, such as functionality for a cache management policy, serial port speed, or clock frequency. Preferably, the one or more OSses and/or the parameters that the user wants to explicitly include can be stored in a configuration file.

Based on the set of applications the user entered in Step 400, the method evaluates all dependencies (Step 410) between an application 60 and the OS pursuant to a set of rules. A dependency is defined as the set of components 200 that an application 60 requires to function correctly (e.g., hardware drivers, back-end interfaces, or function libraries). Preferably, the rules are located in a configuration specification, for example, a file located on the non-volatile storage device 30. In certain embodiments of the present invention, the set of rules may take into account the OS of a target system 180 and/or the target agent 205 functioning on the target system 180 (e.g., how the OS of the target system affects the target agent 205, and how the target agent 205 affects the target server 207).

The method then evaluates all components 200 that the application 60 uses to function correctly on the OS (Step 420) based on the dependencies generated in Step 410 and any components 200 that were included in Step 400, for example, components 200 explicitly included by the user, such as configuration parameters. The method can generate a list of all the components 200 necessary to resolve the dependencies or that have been explicitly included. Preferably, the information generated by Step 420 is stored in a project configuration file that resides on the non-volatile storage device 30. The project configuration file can be specific to the creation of a particular VxWorks® image. Also, during Step 420, a user can be notified of possible configuration errors, such as the dependency analysis not finding a particular component 200, an explicitly added component 200 being missing, and/or that two or more components 200 are conflicting. The configuration errors can be reported to the user on a GUI tool.

The method then creates a new status for each component 200 evaluated or explicitly included in Step 420 (Step 430). In certain embodiments, the status of the component 200 comprises "included", "excluded", "available", "unavailable", and "in error." The status "in error" can be used to describe when one component is conflicting with another component.

The method then builds a new OS (e.g., either the first or second OS 202,204) that integrates the components 200 based on their status (Step 440). For example, the components 200 that are integrated can be those that are listed as "included." Such components 200 may comprise facilities for hardware initialization, interrupt handling and generation, hardware clock and timer management, or mapping of local and bus memory space. Preferably, the OS is compiled from a set of "OS specific" libraries (e.g., the libraries 300). In certain embodiments, the new OS image is built pursuant to a set of rules that are "OS specific."

The OS is then stored in binary format as an OS image (e.g., either the first or second OS image 362,364) (Step 450).

The method then repeats for any remaining OSes that have not yet been configured. For example, the configure OS event (Step 400) may have contained pointers to more than one OS that is to be configured, thus, the method would repeat for each pointer to a particular OS.

Preferably, the OSes being configured are selected from the group of VxWorks® AE; IxWorks®; VxWorks® 5.4; VxWorks®/Cert; varieties of Linux® (e.g., RedHat, Slakware, or glibc-based).

Preferably, a project tool performs the method. Most preferably, the project tool is a Tornado™ project facility. In certain embodiments, the project tool, which can be one of the applications 60, is used to ensure that the OSes conform to the applications 60 that are running on them.

In a parallel processing embodiment, Step 410 can be spawned as a separate thread for each pointer to the OSes in the configure OS event (Step 400). The threads may execute on different devices and/or use resources (e.g., files and memory) on the different devices.

In the preceding specification, the invention has been described with reference to specific exemplary embodiments thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A software tool for configuring a plurality of operating systems, the software tool operable to perform the steps of:
   (a) finding a set of dependencies based on an application and an operating system configuration for a first operating system of a plurality of operating systems;
   (b) based on the set of dependencies, identifying a set of components;
   (c) creating the first operating system by adding the set of components to a kernel of the first operating system; and
   (d) repeating steps a–c for each other operating system of the plurality of operating systems.

2. A software tool for configuring a plurality of operating systems, the software tool operable to perform the steps of:
   finding a set of dependencies based on an application and an operating system configuration for a first operating system of a plurality of operating systems;
   based on the set of dependencies, identifying a set of components;
   creating the first operating system by adding the set of components to a kernel of the first operating system; and repeating the steps of finding, identifying, and creating for a second operating system of the plurality of operating systems.

3. A software tool for configuring a plurality of operating systems, the software tool operable to perform the steps of:
finding a first set of dependencies based on an application and an operating system configuration for a first operating system of a plurality of operating systems;
based on the first set of dependencies, identifying a first set of components;
creating the first operating system by adding the first set of components to a kernel of the first operating system;
finding a second set of dependencies based on the application and the operating system configuration for a second operating system;
based on the second set of dependencies, identifying a second set of components; and
creating the second operating system by adding the second set of components to the kernel of the second operating system.

4. A method for configuring a plurality of operating systems comprising the steps of:
receiving a set of dependencies based on an application and an operating system configuration for a first operating system of a plurality of operating systems on a computer system;
based on the set of dependencies, identifying a set of components;
creating an image of the first operating system by adding the set of components to a kernel of the first operating system;
sending the now created image of the first operating system to the computer system; and
repeating the steps of receiving, identifying, creating and sending for a second operating system of the plurality of operating systems.

5. A method for configuring a plurality of operating systems comprising the steps of:
sending a remote system a set of dependencies based on an application and an operating system configuration for a first operating system of a plurality of operating systems;
receiving the first operating system of a plurality of operating systems, the first operating system based on the set of dependencies and comprising a set of components and a kernel; and
repeating the steps of sending and receiving for a second operating system.

6. The method as recited in claim 1 further comprising the steps of
identifying a status for each component identified in step (b), the status being one of an include status and an unavailable status; and
adding each component of the set of components having an include status to the kernel in step (c).

7. The method as recited in claim 1 further comprising the step of generating an error if one of the components is not present.

8. The method as recite in claim 1 further comprising the step of storing the set of components in a configuration specification file.

9. The method as recite in claim 8 wherein the configuration specification file is a binary file.

10. The method as recited in claim 1 wherein the software tool is a project manager.

11. The method as recited in claim 1 wherein the step of creating is based on a set of rules and parameters specific to the first operating system.

12. The method as recited in claim 2 further comprising the steps of
identifying a status for each component identified in the step of identifying a set of components, the status being one of an include status and an unavailable status; and
adding each component of the set of components having an include status to the kernel in the step of creating the first operating system.

13. The method as recited in claim 2 further comprising the step of generating an error if one of the components is not present.

14. The method as recited in claim 2 further comprising the step of storing the set of components in a configuration specification file.

15. The method as recited in claim 14 wherein the configuration specification file is a binary file.

16. The method as recited in claim 2 wherein the software tool is a project manager.

17. The method as recited in claim 2 wherein the step of creating is based on a set of rules and parameters specific to the first operating system.

18. The method as recited in claim 4 further comprising the steps of
identifying a status for each component identified in the step of identifying a set of components, the status being one of an include status and an unavailable status; and
adding each component of the set of components having an include status to the kernel in the step of creating an image of the first operating system.

19. The method as recited in claim 4 further comprising the step of generating an error if one of the components is not present.

20. The method as recited in claim 4 further comprising the step of storing the set of components in a configuration specification file.

21. The method as recited in claim 20 wherein the configuration specification file is a binary file.

22. The method as recited in claim 4 wherein the steps are performed by a project tool application.

23. The method as recited in claim 4 wherein project tool is a project manager.

24. The method as recited in claim 4 wherein the step of creating is based on a set of rules and parameters specific to the first operating system.

25. The method as recited in claim 4 wherein the step of sending is over an electronic medium.

26. The method as recited in claim 5 wherein the steps of sending and receiving are performed over an electronic medium.

27. A system comprising:
a project specification facility configured to specify a set of rules and parameters to a project tool facility;
the project tool facility configured to configure a plurality of operating systems;
wherein the project tool facility is operable to:
(a) find a set of dependencies based on an application and an operating system configuration for a first operating system of a plurality of operating systems;
(b) based on the set of dependencies, identify a set of components;
(c) create the first operating system by adding the set of components to a kernel of the first operating system; and (d) repeat steps a–c for each of the plurality of operating systems.

28. A system comprising:
a host computing environment operable to:
receiving a set of dependencies based on an application and an operating system configuration for a first operating system of a plurality of operating systems;
based on the set of dependencies, identifying a set of components;
creating the first operating system by adding the set of components to a kernel of the first operating system;
sending the now created first operating system over an electronic medium; and
repeating the steps of receiving, identifying, creating and sending for a second operating system; and
a target computing environment operable to:
sending the set of dependencies based on the application and the operating system configuration for the first operating system to the host computing environment;
receiving the first operating system from the host computing environment, the first operating system based on the set of dependencies and comprising the set of components and the kernel; and
repeating the steps of sending and receiving for a second operating system.

29. A system comprising:
a host computing environment operable to:
receiving a set of dependencies based on an application and an operating system configuration for a first operating system of a plurality of operating systems;
based on the set of dependencies, identifying a set of components;
creating the first operating system by adding the set of components to a kernel of the first operating system;
sending the now created first operating system to a remote entity; and
repeating the steps of receiving, identifying, creating and sending for a second operating system.

30. A system comprising:
a target computing environment operable to:
sending a set of dependencies based on an application and an operating system configuration for a first operating system of a plurality of operating systems;
receiving the first operating system of a plurality of operating systems, the first operating system based on the set of dependencies and comprising a set of components and a kernel; and
repeating the steps of sending and receiving for a second operating system.

31. The system as recited in claim 29 wherein host computing environment is a server.

32. The system as recited in claim 30 wherein target computing environment is a client.

33. A method for configuring a plurality of operating systems in parallel comprising the steps of:
creating a thread for each operating system of a plurality of operating systems, each thread further comprising the steps of:
finding a set of dependencies based on an application and an operating system configuration for one or more of the operating systems;
based on the set of dependencies, identifying a set of components; and
creating the one or more operating systems by adding the set of components to a kernel of the operating system.

34. The method as recited in claim 1 wherein the operating systems are selected from the group consisting of VxWorks AE®, IxWorks®, VxWorks® 5.4, VxWorks/Cert®, and Linux®.

35. The method as recited in claim 2 wherein the operating systems are selected from the group consisting of VxWorks AE®, IxWorks®, VxWorks® 5.4, VxWorks/Cert®, and Linux®.

36. The method as recited in claim 3 wherein the first and second operating systems are selected from the group consisting of VxWorks AE®, IxWorks®, VxWorks® 5.4, VxWorks/Cert®, and Linux®.

37. The method as recited in claim 4 wherein the operating systems are selected from the group consisting of VxWorks AE®, IxWorks®, VxWorks® 5.4, VxWorks/Cert®, and Linux®.

38. The method as recited in claim 5 wherein the operating systems are selected from the group consisting of VxWorks AE®, IxWorks®, VxWorks® 5.4, VxWorks/Cert®, and Linux®.

39. The method as recited in claim 33 wherein the operating systems are selected from the group consisting of VxWorks AE®, IxWorks®, VxWorks® 5.4, VxWorks/Cert®, and Linux®.

40. The method as recited in claim 1 wherein the binary objects for the components are stored in a shared library.

41. The method as recited in claim 2 wherein the binary objects for the components are stored in a shared library.

42. The method as recited in claim 3 wherein the binary objects for components are stored in a shared library.

43. The method as recited in claim 4 wherein the binary objects for components are stored in a shared library.

44. The method as recited in claim 5 wherein the binary objects for components are stored in a shared library.

45. The method as recited in claim 33 wherein the binary objects for components are stored in a shared library.

46. The method as recited in claim 1 wherein the step of identifying further includes the step of locating, on a storage device, the set of components.

47. The method as recited in claim 1 wherein the software tool is a Tornado™ project facility.

48. The method as recited in claim 2 wherein the software tool is a Tornado™ project facility.

49. The method as recited in claim 3 wherein the software tool is a Tornado™ project facility.

50. The method as recited in claim 4 wherein the software tool is a Tornado™ project facility.

51. The method as recited in claim 5 wherein the software tool is a Tornado™ project facility.

52. The method as recited in claim 6 wherein the status further includes "included", "excluded", "unavailable", "available", and "in error".

53. The method as recited in claim 1 wherein the step of identifying the components further comprises identifying the set of components based on a user specification.

54. The method as recited in claim 2 wherein the step of identifying the components further comprises identifying at least one component of the set of components based on a user specification.

55. The method as recited in claim 3 wherein the step of identifying the first set of components further comprises identifying the first set of components based on a user specification; and wherein the step of identifying the second set of components further comprises identifying the second set of components based on the user specification.

56. The method as recited in claim 4 wherein the step of identifying the components further comprises identifying the set of components based on a user specification.

57. The method as recited in claim 5 wherein the step of sending further comprises sending a user specification, the user specification comprising a set of components; and wherein the first operating system is also based on the user specification.

58. The method as recited in claim 53 wherein the user specification further comprises a set of configuration parameters.

59. The method as recited in claim 54 wherein the user specification further comprises a set of configuration parameters.

60. The method as recited in claim 55 wherein the user specification further comprises a set of configuration parameters.

61. The method as recited in claim 56 wherein the user specification further comprises a set of configuration parameters.

62. The method as recited in claim 57 wherein the user specification further comprises a set of configuration parameters.

63. The method of claim 53, wherein the user specification is received via a user interface.

64. The method of claim 53, wherein the user specification is received via an input file.

65. The method of claim 63, wherein the user interface is a graphical user interface.

66. The method of claim 63, wherein the user interface is a command line interface.

67. A software tool for configuring a plurality of operating systems, the software tool operable to perform the steps of:
(a) finding a set of dependencies based on an application and an operating system configuration for a first operating system of a plurality of operating systems;
(b) identifying a first set of components based on the set of dependencies;
(c) receiving, via a user interface, an identification of a second set of components;
(d) creating the first operating system by adding the first and second set of components to a kernel of the first operating system; and
(e) repeating steps a–d for each other operating system of the plurality of operating systems.

* * * * *